May 6, 1969     J. A. HIRSCH ET AL     3,443,180

MOTOR CONTROL SYSTEM FOR A TIMER

Filed Sept. 7, 1965

INVENTORS
JAMES ARTHUR HIRSCH
ROBERT F. SHELTON
BY Robert Levine
ATTORNEY

United States Patent Office 3,443,180
Patented May 6, 1969

3,443,180
MOTOR CONTROL SYSTEM FOR A TIMER
James A. Hirsch and Robert F. Shelton, Indianapolis, Ind., assignors to P. R. Mallory & Co. Inc., Indianapolis, Ind., a corporation of Delaware
Filed Sept. 7, 1965, Ser. No. 485,289
Int. Cl. H02p 1/58, 1/04, 3/00
U.S. Cl. 318—102                                  10 Claims

ABSTRACT OF THE DISCLOSURE

A device for controlling the operation of an appliance including means for controlling motor of a timer and a motor of the appliance. The means including sensing means coupled to a power source responsive to a state of the appliance whereby energizing power from the power source to the motor means of the timer is applied. A switching means operated by the motor means of the timer and coupled to the motor means of the appliance and to the motor means of the timer for energizing the motor means of the appliance and for maintaining the motor means of the timer energized during selected time intervals. Another switching means operated by the motor means of the appliance and coupled to the motor means of the appliance and to the motor means of the timer for maintaining the motor means of the timer and the motor means of the appliance energized.

---

The present invention relates generally to timers and more particularly to the means and method for providing a motor control system for a timer. Many appliances are presently being manufactured which require timers for establishing automatic operational features. These timers usually comprise a constant speed motor which rotates a plurality of switch activating members so as to develop cyclic circuit conditions to control the various component parts of the appliance. For instance, a timer in a washing machine has to provide cyclic circuit conditions to accommodate the filling of the washer with water, the washing cycle, the rinsing cycle, and the spinning cycle.

One of the problems in the past has been to provide a reliable and economical means for controlling the motor of a timer so that said motor will be energized at the proper time and, as a safety factor, so that said motor will continue to be energized during predetermined time intervals.

Accordingly, the present invention provides a means for meeting the abovementioned requirement. In addition, since most appliances have a motor, the present invention provides a means for controlling said motor of said appliance as well as a means for controlling the motor of the timer. The invention then is a novel combination which utilizes features of a sensor, a solid state control circuit, a cyclic timer, and an appliance motor equipped with centrifugal switches. It is particularly novel, in this combination, to use an appliance motor as a means for latching a particular circuit condition.

An attractive feature of the control system of the present invention is that it is versatile. The sensor which is coupled to the solid state control circuit for the timer motor can take many different forms and, therefore, can be used in many types of applications. The various forms which the sensor can take will be discussed later in the specification.

It is an object of the present invention, therefore, to provide a means for controlling the motor of a timer and for controlling the motor of an appliance which incorporates said timer.

It is another object of the present invention to provide a solid state circuit which is responsive to a variety of sensors for controlling a motor of a timer.

It is still another object of the present invention to provide a means for using the motor of an appliance as a latching means for maintaining desired circuit conditions.

It is a further object of the present invention to provide a means for keeping a motor of a timer energized when the sensor coupled to the motor control circuit is not in a required state.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention resides in a timer for controlling the sequential operation of an appliance and is a means for controlling the motor of said timer and the motor of said appliance comprising, a sensor, a circuit coupled to said sensor and to an alternating current power source, said circuit being responsive to a predetermined state of said sensor so as to apply fullwave power from said power source to said motor of said timer, a first cam-switching means coupled to said motor of said timer for energizing said motor of said appliance, a first centrifugal switching means adapted to said motor of said appliance so as to keep said motor of said appliance energized, a second centrifugal switching means adapted to said motor of said appliance so as to keep said motor of said timer energized, a second cam-switching means coupled to said motor of said timer so as to de-energize said motor of said appliance at predetermined time intervals, and a third cam-switching means coupled to said motor of said timer so as to keep said motor of said timer energized during predetermined time intervals.

Figure 1:
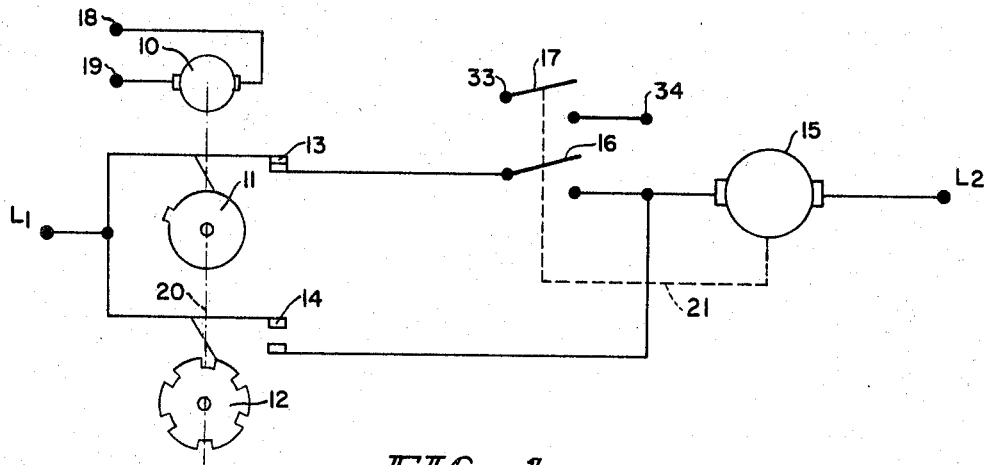
FIGURE 1 is a schematic showing how the motor of an appliance is used as a relay.

Referring now to the drawing, and particularly to the schematic of FIGURE 1, the component parts of the present invention can be visualized in conjunction with the following description. Timer motor 10, which is a constant speed motor, is adapted so as to provide constant speed rotational motion to cams 11 and 12 which are rotatably mounted on camshaft 20 of the timer. Cam 11 operates the normally closed contact 13 and cam 12 operates the normally open contact 14. A first side of an alternating current power source, hereinafter referred to as L1, is coupled to both contacts 13 and 14 and a second side of said alternating current power source, hereinafter referred to as L2, is coupled to one side of the appliance motor, hereinafter referred to as the main motor 15. The normally open contact 14 is coupled to the other side of main motor 15. Switches 16 and 17 are centrifugal switches actuated by the rotation of main motor 15. Linkage 21 coupled switches 16 and 17 to the rotor of main motor 15 so as to close said switches when said main motor is energized. Switch 17 coupled terminals 33 and 34 in the timer motor 10 control circuit shown in FIGURE 2.

Figure 2:
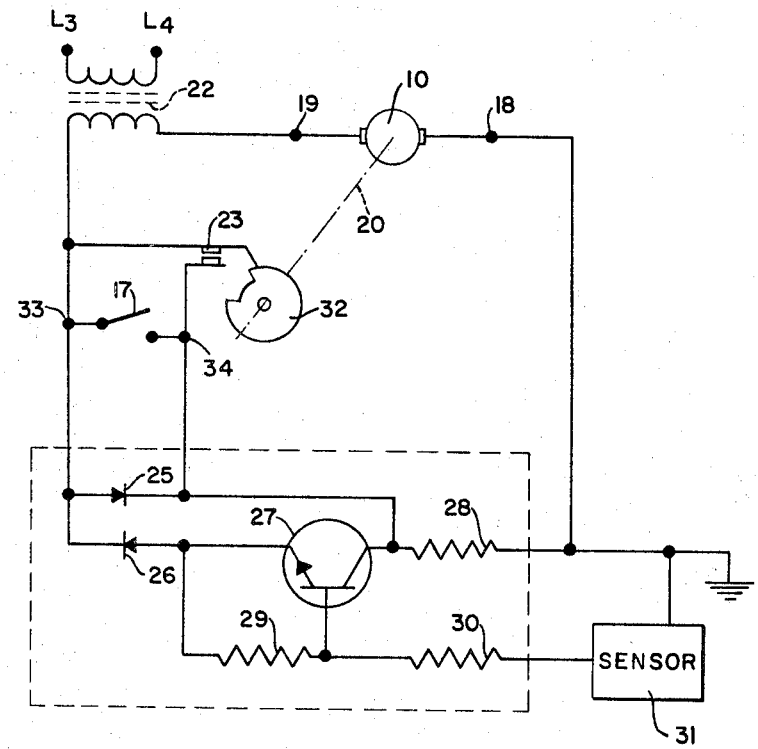
FIGURE 2 is a schematic showing how the timer motor is energized by a sensor and a solid state control circuit.

Referring now to FIGURE 2, we see a schematic of the control circuit for the timer motor 10. Transformer 22 is coupled across an alternating current power source represented by L3 and L4. A first side of the secondary coil of transformer 22 is coupled to terminal 19 which is coupled to a first side of timer motor 10. Terminal 18 couples a second side of timer motor 10 to ground. A second side of the secondary coil of transformer 22 is coupled to the anode of diode 25 and the cathode of diode 26. The cathode of diode 25 is coupled to the collector of transistor 27 and the anode of diode 26 is coupled to the emitter of transistor 27. A resistor 28 is coupled between the collector of transistor 27 and ground. A resistor 29 is coupled between the emitter and base of transistor 27. A resistor 30 is coupled between the base of transistor 27 and one side of sensor 31, the other side of said sensor being coupled to ground. Normally open switch 17 is adapted so as to short out diode 25 when closed. One embodiment of the present invention could have switch 17 operated by the centrifugal action of main motor 15 shown in FIGURE 1. Normally open contact 23 is adapted so as to short out diode 25 when closed by the rotation of cam 32.

The sensor 31 is a means for establishing a circuit condition that will drive transistor 27 into saturation so as to permit full-wave current flow through the timer motor 10. The only requirement is that sensor 31 present a resistance which is less than that resistance which will prevent transistor 27 from being driven into saturation. For example, sensor 31 could be a liquid level sensing means that would present a resistance inversely proportional to the liquid level. As the liquid level increases, the resistance of sensor 31 would decrease until transistor 27 would be driven into saturation. Likewise, sensor 31 could be a temperature sensing resistor with a negative temperature coefficient. As the temperature of a device being controlled would increase, the resistance of the sensor 31 would decrease until transistor 27 would be driven into saturation. Specific values of resistance would be dependent on the specific application of this invention and are not necessary to this specification. Because sensor 31 can take a variety of forms to accomplish the same purpose, it will be referred to as a sensor, as a sensing means for providing a predetermined resistance for a predetermined condition of the appliance, as a resistive means for determining a liquid level in said appliance, or as a resistive means for determining a temperature of said appliance.

The cam 11 and contact 13 shown in FIGURE 2, are a cam-switching means for open circuiting the appliance motor referred to as a main motor 15. Cam 12 and contact 14 are a cam-switching means for energizing the appliance motor. The cam 32 and contact 23 are a cam-switching means for keeping the motor 10 of the timer energized during predetermined time intervals. Switch 17, shown in FIGURE 1, is a centrifugal switching means for keeping the motor 10 of the timer energized and switch 16 is a centrifugal switching means for keeping the appliance motor energized.

With the above description of components in mind, and by making reference to the drawing figures, the following analysis of operation will serve to convey the functional details of the present invention. Referring again to FIGURE 1, we can see that an alternating current applied across L1 and L2 will energize main motor 15 if contact 14 is allowed to close by cam 12. Thus, when timer motor 10 is energized to drive cam 12, contact 14 will close to energize main motor 15. When main motor 15 rotates, centrifugal switches 16 and 17, which are normally open, are closed by linkage 21. Centrifugal switch 16 keeps current flowing through the main motor 15 from L1 and L2 and centrifugal switch 17 couples terminals 33 and 34 so as to keep timer motor 10 energized regardless of what happens to sensor 31 shown in FIGURE 2. Once switch 16 is closed, the main motor 15 will be energized until normally closed contacts 13 are opened by cam 11.

Referring now to FIGURE 2, we can discuss the operation of the control circuit for the timer motor 10. The alternating current applied across L3 and L4 is stepped down by transformer 22 to provide isolation from line if required, and to develop a voltage necessary for operating timer motor 10 and the control circuit. With the switch 17 and contact 23 in the position shown, half-wave current flows through the diode 25, resistor 28 and the timer motor 10. The half-wave current is not sufficient to start the timer motor 10. When the resistance of sensor 31 is reduced to the point that will permit transistor 27 to be driven to saturation every other alternation, full-wave current can flow through timer motor 10, thereby energizing said timer motor. The full-wave current will continue to flow through timer motor 10 as long as sensor 31 presents the correct resistance or when switch 17 is closed or when contact 23 is closed by cam 32. Switch 17 is closed by the rotation of the main motor 15, shown in FIGURE 1, so as to prevent stoppage of timer motor 10 regardless of what happens to sensor 31.

Now if we assume that the present invention has been applied to a washing machine which is controlled by a timer, the following analysis will serve to describe a practical application. Sensor 31 could be adapted to determine the level of water in the washing machine and to present the correct resistance when the water is at a desired level. When the correct resistance is presented by sensor 31 the timer motor 10 would be energized and would rotate cam 12, shown in FIGURE 1, to close contact 14 to energize the main motor 15 of the washing machine. An extra centrifugal switch could be operated by main motor 15 to close a solenoid-operated valve, thereby preventing flow of water into the washing machine. The main motor will continue to run until normally closed contact 13 is opened by cam 11 which is rotated by timer motor 10. In this manner the timer would control the operation of the washing machine. Other applications of the present invention may be derived merely by changing the sensor 31 and providing different cam-switching functions for the timer.

The control circuitry of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. In a device for controlling the operation of an appliance, means for controlling motor means of a timer means and motor means of said appliance comprising, a sensor, a circuit coupled to said sensor and to an alternating current power source, said circuit being responsive to a predetermined state of said sensor so as to apply full-wave power from said power source to motor means of a timer through said circuit, first cam operated switching means operated by said motor means of said timer and coupled between said power source and motor means of an appliance for energizing said motor means of said appliance, first centrifugal switching means operated by said motor means of said appliance and coupled between said power source and said motor means of said appliance so as to keep said motor means of said appliance energized, second centrifugal switching means operated by said motor means of said appliance and coupled between said power source and said motor means of said timer so as to keep said motor means of said timer energized, second cam operated switching means operated by said motor means of said timer and coupled between said power source and said motor of said appliance so as to de-energize said motor of said appliance during predetermined time intervals, and third cam operated switching means operated by said motor of said timer and coupled between said power source and said motor of said timer so as to keep said motor means of said timer energized during predetermined time intervals.

2. In a device for controlling the operation of an appliance, means for controlling motor means of a timer means and motor means of said appliance comprising, sensing means for providing a predetermined resistance in response to a predetermined condition of said appliance, a solid state circuit coupled to said sensing means and to an alternating current power source, said circuit being responsive to said predetermined resistance of said sensing means so as to apply full-wave power from said power source to motor means of a timer through said circuit, first cam operated switching means operated by said motor means of said timer and coupled between said power source and motor means of an appliance for energizing said motor means of said appliance, first centrifugal switching means operated by said motor means of said appliance and coupled between said power source and said motor means of said appliance so as to keep said motor means of said appliance energized, second centrifugal switching means operated by said motor means of said appliance and coupled between said power source and said motor means of said timer so as to keep said motor means of said timer energized, second cam operated switching means operated by said motor means of said timer and coupled between said power source and said motor of said appliance so as to de-energize said motor means of said appliance during predetermined time intervals, and third cam operated switching means operated by said motor means of said timer and coupled between said power source and said motor means of said timer so as to keep said motor means of said timer energized during predetermined time intervals.

3. In a device for controlling the operation of an appliance as claimed in claim 2, wherein said means for controlling said motor means of said timer comprises first and second diodes, a first side of said power source coupled to an anode of said first diode and a cathode of said second diode, a second side of said power source coupled to a first side of said motor means, first resistor means coupled between the cathode of said first diode and a second side of said motor means permitting current flow from said power source in a first direction through said motor means, the anode of said second diode coupled to an emitter of transistor means, second resistor means coupled between said emitter and a base of said transistor means, third resistor means coupled between said base of said transistor means and a first side of said sensing means, said first resistor means coupled between a collector of said transistor means and a second side of said cam operated switching means operated by said motor means of said timer and coupled between said power source and said motor of said appliance so as to de-energize said motor means of said appliance during predetermined time intervals, and third cam operated switching means operated by said motor means of said timer and coupled between said power source and said motor means of said timer so as to keep said motor means of said timer energized during predetermined time intervals.

4. In a device for controlling the operation of an appliance, means for controlling motor means of timer means and motor means of said appliance comprising, a sensor, a circuit coupled to said sensor and to an alternating current power source, said circuit being responsive to a predetermined state of said sensor so as to apply full-wave power from said power source to motor means of a timer through said circuit, a plurality of cam operated switching means actuated by said motor means of said timer and coupled to motor means of an appliance and to said motor means of said timer for energizing said motor means of said appliance and for keeping said motor means of said timer energized during predetermined time intervals, and a plurality of centrifugal switching means operated by said motor means of said appliance and coupled to said motor means of said appliance and to said motor means of said timer for keeping said motor means of said timer and said motor means of said appliance energized.

5. In a device for controlling the operation of an appliance as claimed in claim 4, wherein said sensor includes means activated by a determinable liquid level in said appliance, said circuit responsive to said activated means of said sensor so as to apply full wave power from said power source to said motor means of said timer.

6. In a device for controlling the operation of an appliance as claimed in claim 4, wherein said sensor includes means activated by a determinable temperature in said appliance, said circuit responsive to said activated means of said sensor so as to apply full wave power from said power source to said motor of said timer.

7. In a device for controlling the operation of an appliance, means for controlling the motor means of a timer means and motor means of said appliance comprising, an alternating current power source, a diode coupled in series with motor means of a timer, said diode being coupled to said alternating current power source so as to permit current flow in a first direction through said motor means of said timer, a solid state circuit coupled to said motor means of said timer and to said alternating current power source, sensing means for providing a predetermined resistance in response to a predetermined condition of an appliance, said sensing means coupled to said solid state circuit, said solid state circuit responsive to said predetermined resistance of said sensing means so as to permit current flow from said alternating current power source in a second direction through said motor means of said timer thereby energizing said motor means of said timer, a plurality of cam operated switching means actuated by said motor means of said timer and coupled to motor means of said appliance and to said motor means of said timer for energizing said motor means of said appliance and for keeping said motor means of said timer energized during predetermined time intervals, and centrifugal switching means operated by said motor means of said appliance and coupled to said motor means of said appliance and to said motor means of said timer for keeping said motor means of said timer and said motor means of said appliance energized.

8. In a device for controlling the sequential operation of an appliance, means for controlling the motor means of a timer means and motor means of said appliance comprising, an alternating current power source, a diode coupled in series with said motor means of said timer, said diode being coupled to said alternating current power source so as to permit current flow in a first direction through motor means of a timer, a solid state circuit coupled to said motor means of said timer and to said alternating current power source, resistive means for determining a liquid level in said appliance, said resistive means being coupled to said solid state circuit, said solid state circuit responsive to a predetermined resistance of said resistive means so as to permit current flow from said alternating current power source in a second direction through said motor means of said timer, thereby energizing said motor of said timer, a plurality of cam operated switching means actuated by said motor means of said timer and coupled to motor means of an appliance and to said motor means of said timer for energizing said motor means of said appliance and for keeping said motor of said timer energized during predetermined time intervals, and centrifugal switching means operated by said motor means of said appliance and coupled to said motor means of said appliance and to said motor means of said timer for keeping said motor means of said timer and said motor means of said appliance energized.

9. In a device for controlling the operation of an appliance, means for controlling motor means of a timer means and motor means of said appliance comprising, sensing means coupled to a power source, said sensing means responsive to a predetermined state of said appliance so as to apply energizing power from said power source to motor means of a timer, a plurality of switching means operated by said motor means of said timer and coupled to motor means of an appliance and to said motor means of said timer for energizing said motor means of said appliance and for keeping said motor means of said timer energized during predetermined time intervals, and another switching means operated by said motor means of said appliance and coupled to said motor means of said appliance and to said motor means of said timer for keeping said motor means of said timer and said motor means of said appliance energized independent of said sensing means.

10. In a device for controlling the operation of an appliance, means for controlling operating means of a timer means and operating means of said appliance comprising, sensing means coupled to a power source, said sensing means responsive to a predetermined state of said appliance so as to apply energizing power from said power source to operating means of a timer, a plurality of switching means operated by said operating means of said timer and coupled to operating means of an appliance and to said means of said timer for energizing said operating means of said appliance and for keeping said operating means of said timer energized during predetermined time intervals, and another switching means operated by said operating means of said appliance and coupled to said operating means of said appliance and to said means of said timer for keeping said operating means of said timer and said operating means of said appliance energized independent of said sensing means.

References Cited

UNITED STATES PATENTS

| | | | |
|---|---|---|---|
| 3,044,000 | 7/1962 | Bahra | 318—486 X |
| 3,248,632 | 4/1966 | Bowman | 318—486 X |

ORIS L. RADER, *Primary Examiner.*

K. L. CROSSON, *Assistant Examiner.*

U.S. Cl. X.R.

318—486